United States Patent
Boesch et al.

(10) Patent No.: US 9,645,970 B2
(45) Date of Patent: May 9, 2017

(54) DRIVER COACHING SYSTEM

(71) Applicant: FORD GLOBAL TECHNOLOGIES, LLC, Dearborn, MI (US)

(72) Inventors: Mathew Alan Boesch, Plymouth, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 588 days.

(21) Appl. No.: 13/779,870

(22) Filed: Feb. 28, 2013

(65) Prior Publication Data

US 2014/0244150 A1 Aug. 28, 2014

(51) Int. Cl.
  *G06F 17/00* (2006.01)
  *B60W 40/09* (2012.01)
  *B60R 16/023* (2006.01)

(52) U.S. Cl.
  CPC .......... *G06F 17/00* (2013.01); *B60R 16/0236* (2013.01); *B60W 40/09* (2013.01); *B60W 2520/10* (2013.01); *B60W 2540/10* (2013.01); *B60W 2550/22* (2013.01)

(58) Field of Classification Search
  None
  See application file for complete search history.

(56) References Cited

U.S. PATENT DOCUMENTS

| | | | |
|---|---|---|---|
| 4,008,423 A * | 2/1977 | Christianson et al. | 318/139 |
| 6,366,848 B1 | 4/2002 | Gustavsson | |
| 6,560,529 B1 * | 5/2003 | Janssen | 701/469 |
| 8,108,136 B2 | 1/2012 | Filev et al. | |
| 2007/0050130 A1 * | 3/2007 | Grimm et al. | 701/208 |
| 2008/0255722 A1 * | 10/2008 | McClellan et al. | 701/35 |
| 2009/0043467 A1 * | 2/2009 | Filev et al. | 701/57 |
| 2010/0023181 A1 | 1/2010 | Huang et al. | |
| 2010/0204896 A1 * | 8/2010 | Biondo et al. | 701/93 |
| 2010/0205012 A1 | 8/2010 | McClellan | |
| 2011/0130943 A1 * | 6/2011 | Hysko et al. | 701/103 |
| 2011/0133921 A1 * | 6/2011 | Harumoto | F02D 29/02 340/439 |
| 2011/0270513 A1 * | 11/2011 | Shida | 701/117 |
| 2014/0038640 A1 * | 2/2014 | Wesselius et al. | 455/456.1 |

FOREIGN PATENT DOCUMENTS

| | | | |
|---|---|---|---|
| WO | WO-2007140232 A2 | 12/2007 | |
| WO | WO-2008110739 A1 | 9/2008 | |

* cited by examiner

*Primary Examiner* — Todd Melton
*Assistant Examiner* — Jason Roberson
(74) *Attorney, Agent, or Firm* — Franklin A. MacKenzie; Brooks Kushman P.C.

(57) ABSTRACT

A driver coaching system may have an input device generating an input signal indicative of a road condition. The system may also include an advisory device determining an output conveyed to a driver and indicative of a fuel efficiency rating based on an actual vehicle speed and an optimum fuel efficient speed. The advisory device may not decrease the fuel efficiency rating when the road condition does not warrant the optimum fuel efficient speed.

28 Claims, 3 Drawing Sheets

DRIVER COACHING SYSTEM

BACKGROUND

Driver coaching systems may convey feedback or fuel efficiency rating to drivers based on smoothness of acceleration, smoothness of braking and average vehicle speed. The systems typically calculate the rating without regard to posted speed limits, other road signs, traffic congestion or other environmental conditions. In one example, a vehicle may reach its highest fuel economy when the vehicle is operated at an optimum fuel efficient speed of approximately 55 kilometers per hour (35 miles per hour). This vehicle may not be operated at the optimum speed when, for example, the vehicle travels on a freeway having a minimum speed limit of about 70 kph (45 mph), and the coaching system for this vehicle may not adequately credit or may even decrease the fuel efficiency rating because the actual vehicle speed is traveling substantially faster than the optimum speed. Similarly, the same coaching system may decrease the fuel efficiency rating when the vehicle is traveling in a residential area having a maximum speed limit of 40 kph (25 mph) and the driver is abiding by the posted maximum speed limit well below the optimum speed. In this respect, existing coaching systems may penalize or not adequately credit a driver who complies with local traffic laws.

On the other hand, the system may also unduly credit or increase the fuel efficiency rating when the average vehicle speed is at or near an optimum speed due to frequent stop-and-go driving. Continuing with the previous example of the vehicle having an optimum speed of 55 kph (35 mph), the vehicle may travel along an inner city road at an average speed substantially close to the optimum speed, as a result of the vehicle idling at a full stop at multiple traffic lights and accelerating up to a top speed of at least 70 kph (45 mph) between traffic lights without ever maintaining a cruising speed of 55 kph (35 mph). In this respect, the system may provide an unduly high fuel efficiency rating despite the generally excessive vehicle speed above the optimum fuel efficient speed and idling at full stops.

A need exists to coach a driver to operate his vehicle in a manner that improves the fuel economy of the car, without encouraging the driver to violate traffic laws or disregard other road conditions.

SUMMARY

One embodiment of a driver coaching system may have an input device generating an input signal indicative of a road condition. The system may also include an advisory device determining an output conveyed to a driver and indicative of a fuel efficiency rating based on an actual vehicle speed and an optimum fuel efficient speed. The advisory device may not decrease the fuel efficiency rating when the road condition does not warrant the optimum fuel efficient speed.

Another embodiment of a driver coaching system may include an input device generating an input signal indicative of a road condition. The advisory device may determine a feedback conveyed to a driver and indicative of a fuel efficiency rating based on an actual vehicle speed and an optimum fuel efficient speed. Furthermore, the advisory device may not decrease the fuel efficiency rating when the vehicle is within a minimum stopping distance from the road condition.

A process for operating a driver coaching system for a vehicle traveling along a route, may include the steps of detecting an average vehicle speed, detecting a road condition, determining a speed corresponding with a road condition, and determining whether driving the vehicle at an optimum fuel efficient speed for the vehicle complies with the speed for the road condition. The process may further include the step of determining a fuel efficiency rating when the optimum fuel efficient speed complies with the speed for the road condition. In addition, the process may also include refraining from determining the fuel efficiency rating when the optimum fuel efficient speed does not comply with the speed for the road condition.

DETAILED DESCRIPTION

Figure 1:
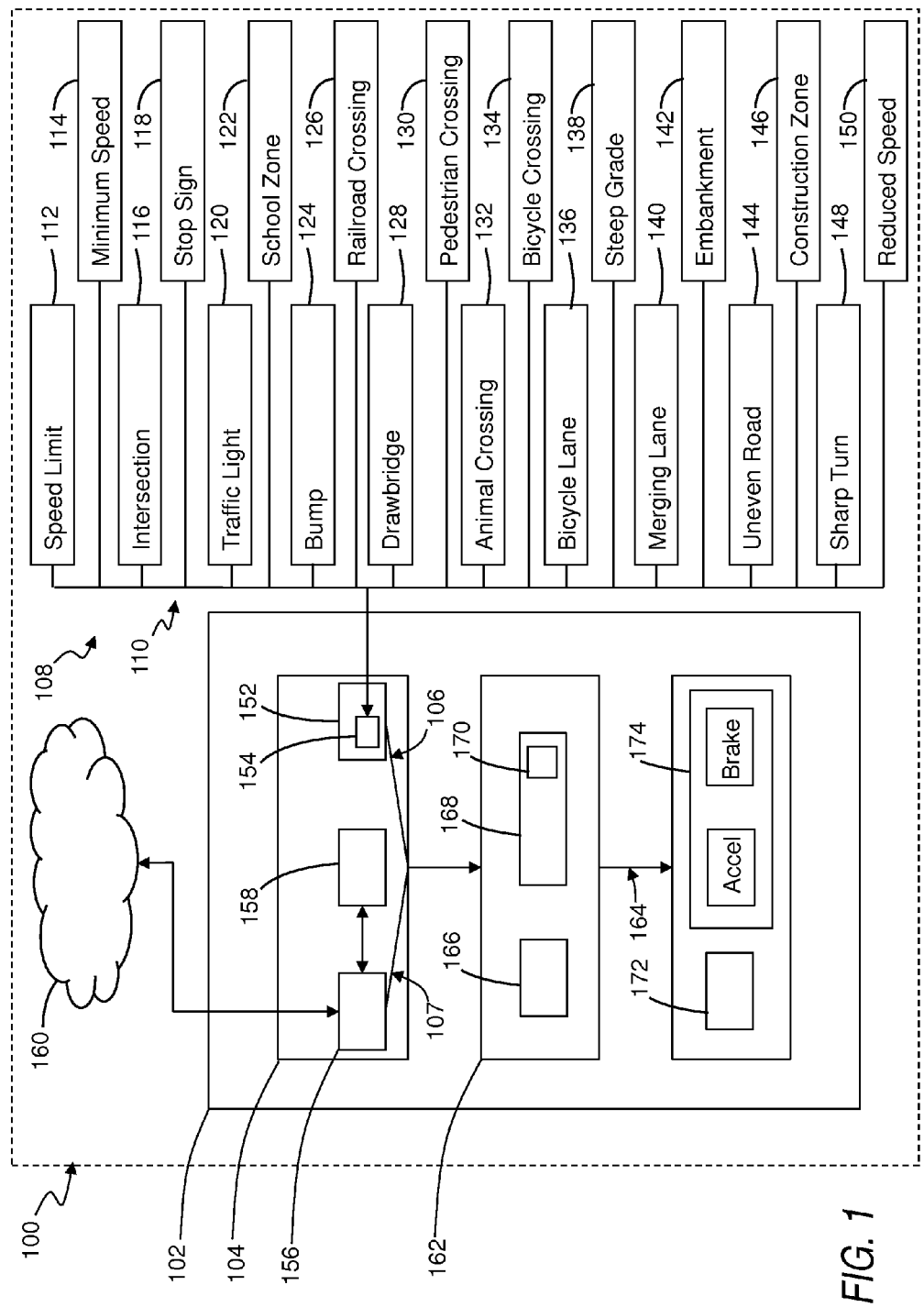
FIG. 1 illustrates a schematic view of one embodiment of driver coaching system for a vehicle that refrains from decreasing a fuel efficiency rating when the vehicle experiences certain road conditions.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

An exemplary driver coaching system may provide a driver with feedback or fuel efficiency rating, and may refrain from updating the rating when the driver deviates from optimum fuel efficient operating conditions, so that the driver may comply with local traffic laws and/or otherwise adequately respond to a road condition without being penalized for taking such action. The system may include various components and execute processes for determining desired fuel economy, instantaneous fuel economy and driver advisory output, such as haptic feedback that may be in the form of adjusting an accelerator pedal modifier and a brake pedal modifier as disclosed in U.S. Pat. No. 8,108,136 to Filev, which is incorporated by reference herein. The system may determine the fuel efficiency rating based on desired and instantaneous fuel economy, which may in turn be based on an actual vehicle speed and an optimum fuel efficient speed.

Referring to FIG. 1, a driver coaching system 100 for a vehicle 102 may include an input device 104 generating an input signal 106 indicative of a road condition 108, which may require the driver to operate the vehicle in manner that may deviate from an optimum fuel efficient operation of the vehicle. The road condition may be in the form of a road sign 110 displaying a maximum speed limit 112 or a road sign displaying a minimum speed limit 114. However, other road signs may caution the driver of an upcoming condition in the road, such as an intersection 116, a stop sign 118, a traffic light 120, a school zone 122, a bump 124, a railroad crossing 126, a drawbridge 128, a pedestrian crossing 130, an animal crossing 132, a bicycle crossing 134, a bicycle lane 136, a steep grade 138, a merging lane 140, an embankment 142, an uneven road surface 144, a construction zone 146, a sharp turn 148, and a reduced speed zone 150.

The input device 104 may include a traffic sign recognition device 152 (TSR device), which may include a forward looking camera 154 mounted to the vehicle 102 for generating input signal 106, upon detecting the presence of the road sign 110 and determining the content of the road sign. For example, the TSR device 152 may recognize the presence of a maximum speed limit sign and execute character recognition algorithm to identify the actual numerical value of the maximum speed limit posted on the sign, such as 40 kph (25 mph). Similarly, the TSR device 152 may detect the presence of a minimum speed limit sign and execute character recognition algorithm to identify or determine a minimum speed limit posted on the sign, such as approximately 70 kph (45 mph). By way of other examples, the TSR device 152 may also execute character recognition algorithms to detect symbols, text and combinations thereof, which may be associated with a school zone, a construction zone, a sharp curve, an embankment, an uneven road surface or another reduced speed zone. The TSR device may utilize a sign lookup table to further correlate the detected symbols and text with a corresponding maximum speed limit, such as approximately 40 kph limit (25 mph) for the school zone, construction zone, sharp curve, embankment, uneven road surface or other reduced speed zones.

The input device 104 may further include a global position satellite unit 156 ("GPS unit") coupled to at least one of a map database 158 and a cloud-based input 160, that each have a local speed limit lookup table for a plurality of routes. The GPS unit 156 may generate an input signal 107 indicative of the distance from the vehicle 102 to a road condition along the route and the related speed limit.

The driver coaching system 100 may further include an advisory device 162, which may determine an optimum fuel efficient speed ("optimum speed") for the vehicle and further determine a fuel efficiency rating ("rating") for the vehicle based on the average speed and the optimum speed. The average speed and the optimum speed may be respectively determined from calculations for instantaneous fuel economy and desired fuel economy, as disclosed in U.S. Pat. No. 8,108,136 to Filev. In this respect, the system may determine the rating and provide the output to the driver based on the rating.

In one embodiment, the advisory device 162 may generally increase the rating when the vehicle is traveling at or within a predetermined range of the optimum speed for generally longer intervals of time. The optimum speed may be a predetermined fixed value stored within a computer readable medium or other portion of the system, as determined by the manufacturer through empirical testing of the given vehicle. For example, based on the empirical data, the optimum speed for a given vehicle may be determined to be approximately 55 kph (35 mph). Of course, the optimum speed may be more or less than 55 kph (35 mph) depending on the vehicle. In another embodiment, the system 100 may further include multiple sensors and execute an algorithm to determine an optimum speed in real time based on, for example, steep grade detected by level sensors, passenger load detected by passenger weight sensors, cargo load detected by cargo weight sensors and various other parameters that may modify the optimum speed for improving vehicle fuel efficiency.

The advisory device 162 may determine an output 164 based on the input signal from any one or more components of the input device, and convey feedback or the fuel efficiency rating to the driver, without decreasing the rating when the driver is properly responding to the road condition. In particular, the advisory device 162 may include a fuzzy logic controller 166 that may determine the fuel efficiency rating based on the actual vehicle speed and the optimum fuel efficient speed similar to the system disclosed in U.S. Pat. No. 8,108,136 to Filev. However, the system 100 may be further configured to avoid decreasing the rating when the road condition does not warrant the vehicle to travel at the optimum speed as described hereinbelow.

The controller 166 may refrain from decreasing the rating when the controller 166 determines that the road condition is a road sign displaying a minimum speed limit that is more than the optimum speed and further when the actual vehicle speed is at least the minimum speed limit. In particular, continuing with a previous example, the controller 166 may determine that the optimum speed is 55 kph (35 mph) and may further receive the input signal from the TSR device 152, which indicates that the vehicle is approaching a portion of the route having a road condition in the form of a road sign displaying a corresponding minimum speed limit of 72 kph (45 mph), as may be required on, for example, a freeway. The controller 166 may further determine that the actual vehicle speed is the minimum speed of 72 kph (45 mph) and thus refrain from decreasing the fuel efficiency rating, so as to avoid discouraging the driver from abiding by the minimum speed limit. The controller may be further configured to refrain from decreasing the rating if the controller determines the vehicle is traveling at a speed more than the minimum speed limit. However, in another embodiment, the controller may decrease the rating if the controller determines that the vehicle is traveling more than the minimum speed or more than an offset value above the minimum speed limit, such as approximately 16 kph (10 mph) above the minimum speed limit. This penalty may mitigate fuel efficiency losses, while still permitting the driver to drive with the flow of traffic or otherwise operate the vehicle in the manner associated with the road condition.

Furthermore, the controller 166 may refrain from decreasing the rating when the controller determines that the road condition is a road sign indicative of a maximum speed limit that is less than the optimum speed and further when the actual vehicle speed is up to the maximum speed limit. For example, the controller 166 may determine that the optimum speed is 55 kph (35 mph) and receive the input signal from the TSR device 152, which indicates that the vehicle is approaching a portion of its route having a road condition in the form of a road sign having a maximum speed limit of 40 kph (25 mph). In this example, the controller 166 may further determine that the actual vehicle speed is 40 kph (25 mph) and refrain from decreasing the fuel efficiency rating, so as to encourage the driver to abide by the maximum speed limit. The controller may be further configured to refrain from decreasing the rating if the controller determines that the vehicle is traveling at a speed less than the maximum speed limit. However, in another embodiment, the controller may be configured to decrease the rating if the vehicle is traveling less than the maximum speed limit or less than an offset value below the maximum speed limit, such as approximately 16 kph (10 mph) below the maximum speed limit. This penalty may mitigate fuel efficiency losses while permitting the driver to drive with the flow of traffic and otherwise operate the vehicle in a manner related to the associated road condition.

The controller 166 may also refrain from decreasing the rating when the controller determines that the vehicle is within a predetermined distance of a road condition, based on the input signal received from the GPS unit. In this respect, the system may encourage the driver to cautiously approach the traffic light or other road condition and account for safe stopping distances and/or high volumes of traffic through an intersection. Similarly, the controller may refrain from decreasing the rating when the vehicle is gradually accelerating away from the traffic light below the optimum speed and still within the predetermined distance of the traffic light. Of course, the input signal from the GPS unit may indicate that the road conditions may be other conditions, including a stop sign, a railroad crossing, a draw bridge, a construction zone, a real-time high traffic portion of the route or various other road conditions in which the driver may be required to deviate from the optimum speed. In addition, the predetermined distance from the road condition may be more or less than 100 meters (330 feet).

The controller may further refrain from decreasing the rating when the vehicle is within a minimum stopping distance from the road condition. In particular, the system 100 may further include a stopping distance database 168 including a lookup table 170 of a plurality of reference minimum stopping distances for the vehicle and an associated plurality of reference vehicle speeds. The controller 166 may be coupled to the database 168 and determine an instantaneous minimum stopping distance in response to comparing the actual vehicle speed to the plurality of associated reference vehicle speeds. The controller 166 may then determine the distance of the vehicle from an intersection or other road condition. If this distance is more than the minimum stopping distance by a factor of three or other predetermined value, the controller 166 may determine the rating, as the vehicle may be traveling at a somewhat high speed because the traffic light may have a green light or the other road condition may otherwise no longer require the driver to deviate from the optimum speed.

The controller 166 may decrease the rating when the controller determines that the road condition is a road sign indicative of a maximum speed limit and further when the actual vehicle speed is more than the maximum speed limit. For example, the input signal may be based on a road condition indicative of a posted maximum speed limit of approximately 25 kph (15 mph) for a residential area, and the actual vehicle speed may be equal to an optimum speed of 55 kph (35 mph). The controller may decrease the rating by a squared function of the actual vehicle speed above the posted maximum speed limit. Of course, the controller may decrease the rating by other suitable calculations. In another embodiment, the controller 166 may decrease the rating when the controller determines that the road condition is a road sign indicative of a maximum speed limit and further when the actual vehicle speed is at least a threshold of, for example, 16 kph (10 mph) above the maximum speed limit. This threshold may account for the flow of traffic within a certain range beyond, for example, a maximum speed limit. In this example, the controller may decrease the rating by a squared function of the actual vehicle speed above the threshold or by other suitable calculations.

The controller may be also configured to decrease the rating when the controller determines that the road condition is a road sign displaying a minimum speed limit and further when the actual vehicle speed is less than the minimum speed. For example, the controller may decrease the rating when the road sign displays a posted minimum speed limit, such as 72 kph (45 mph), and the actual vehicle speed is equal to an optimum speed, such as 55 kph (35 mph). The controller may decrease the rating by a squared function of the actual vehicle speed below the minimum speed limit. Of course, the controller may be configured to decrease the rating by other calculations and may refrain from decreasing only for a portion of the actual vehicle speed that is below a threshold less than the minimum speed limit.

The system 100 may further include a display screen 172 and/or a haptic feedback mechanism 174 to convey the feedback or rating to the driver so as to guide the driver to maximize an operating economy of the vehicle. In particular, the controller 166 may generate an output or actuation signal 164 in response to determining how to modify or maintain the rating as discussed in detail above. The display screen 172 or message center may receive the actuation signal and display a message indicative of the rating in response to receiving the actuation signal. For example, the display screen 172 may display a numerical value, metrics or a graphic that conveys the rating to the driver. The haptic feedback mechanism 174 may be the accelerator pedal assembly and/or the brake pedal assembly disclosed in U.S. Pat. No. 8,108,136 to Filev, that conveys to the driver a pedal position feedback sensory signal for adjusting an intensity of the resistance of the pedal to movement by the driver.

Figure 2:
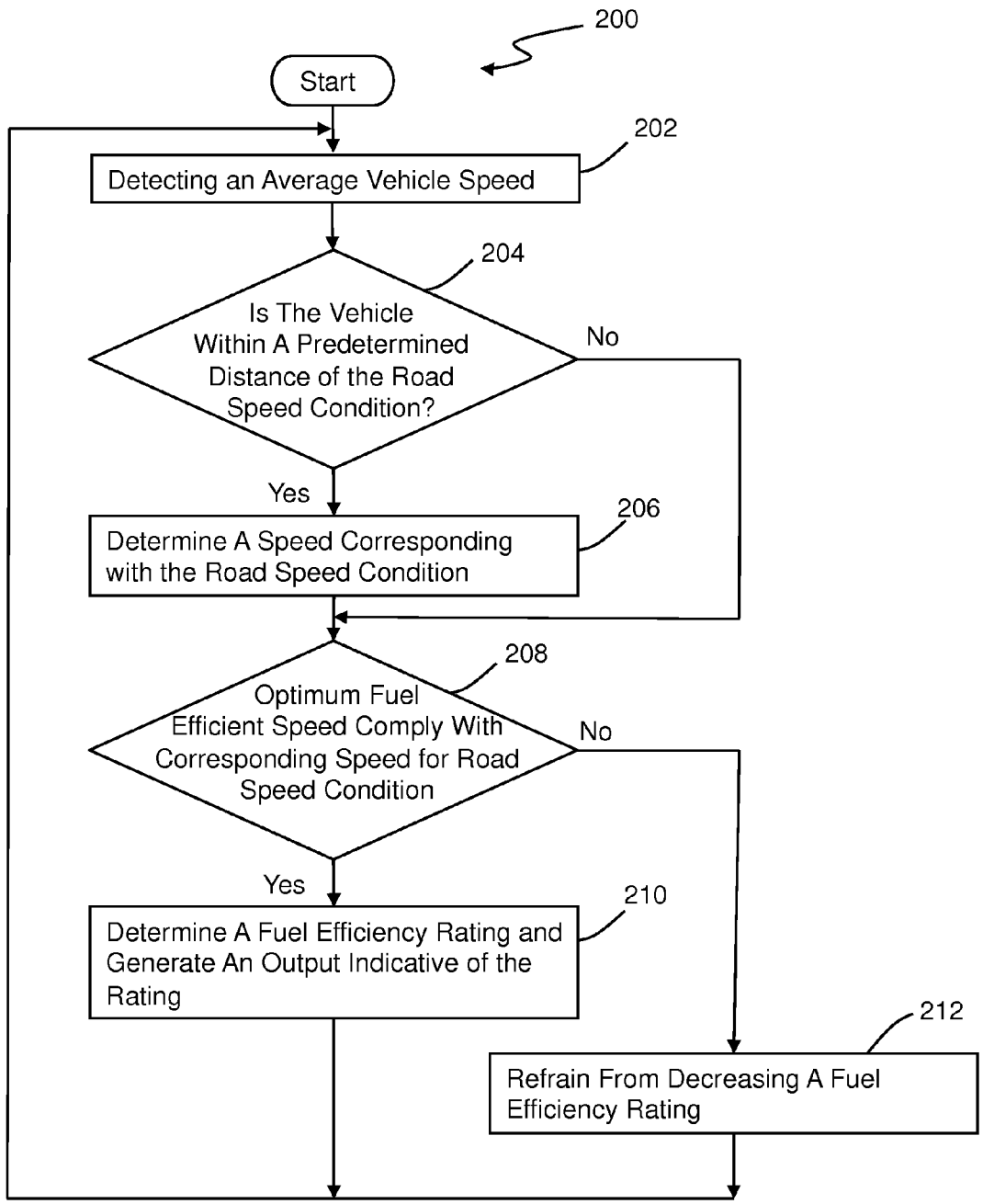
FIG. 2 illustrates a flow chart for one embodiment of a process for operating the driver coaching system of FIG. 1.

Referring to FIG. 2, a process 200 for operating the driver coaching system 100 of FIG. 1 for the vehicle 102 traveling along the route may include the step 202 of detecting an average vehicle speed. This step may include detecting an instantaneous vehicle speed in order to calculate the average vehicle speed.

At step 204, the controller may determine whether the vehicle is within a predetermined distance of the road condition. In one embodiment, the system may include the TSR device 152 which produces the input signal when the road condition comes within the range of the TSR device. In another embodiment, the system may include the GPS unit XX which identifies the distance of the vehicle from the road condition. For example, the controller may receive the input signal from the GPS unit, indicative of a distance from the vehicle to the road condition. If the controller determines that the vehicle is within a predetermined distance of a road condition, such as 100 meters (330 feet) of a stop sign, the system may proceed to step 206. If the controller does not determine that the vehicle is within a predetermined distance of the road condition, the process may proceed to step 208.

At step 206, the controller may determine a corresponding speed for the road condition. For example, the controller may determine that the corresponding speed is zero kph (zero mph) for the stop sign.

At step 208, the controller may determine whether the optimum fuel efficient speed complies with the corresponding speed for the association. Continuing with the previous example, the optimum speed may be 55 kph (35 mph), and the corresponding speed for the road speed configuration, such as a stop sign, may be zero kph (zero mph). In this respect, operating the vehicle in a fuel efficient manner at the optimum speed would require the driver to drive through the stop sign without stopping thus violating the traffic laws. If the optimum speed does comply with the corresponding speed, the process may proceed to step 210. If the optimum speed does not comply with the corresponding speed, the process may proceed to step 212.

At step 210, the controller may determine the feedback or fuel efficiency rating and generate the output indicative of the rating. In particular, the controller may generate the output based on an actual vehicle speed and an optimum fuel efficient speed. The output may be generated by the controller 166 of the advisory system 100 based on instantaneous fuel economy and desired fuel economy as indicated above. The output may be conveyed to the driver to provide the driver with guidance for maximizing an operating economy of the vehicle. In particular, the controller may determine an optimum accelerator pedal position based on a desired fuel economy and an instantaneous fuel economy. The controller may further determine a fuel economy error, a rate of change of fuel economy error and an accelerator pedal position modifier based on the fuel economy error, the rate of change of fuel economy error and an instantaneous engine power. The controller may integrate the accelerator pedal position modifier within an appropriate saturation limit to determine an optimum accelerator pedal position for a driver demand for power for a given instantaneous operating condition, such that the driver may be provided with guidance to improve the fuel efficiency rating. However, this rating may be conveyed to the driver by utilizing the display screen 172 or message center to illustrate a numerical value, a graphic or other image indicative of the rating to the driver. The process may utilize various other devices and methods for conveying the rating to the driver. Then, the process may return to step 202.

At step 212, the process may refrain from decreasing the rating. Continuing with the previous example, a driver would not be penalized for deviating from the optimum speed by, for example, bringing the vehicle to a full stop at a stop sign. In this respect, the process may decrease the rating for driver demand unrelated to the driver complying with local traffic laws and road conditions. Then, the process may return to step 202.

Figure 3:
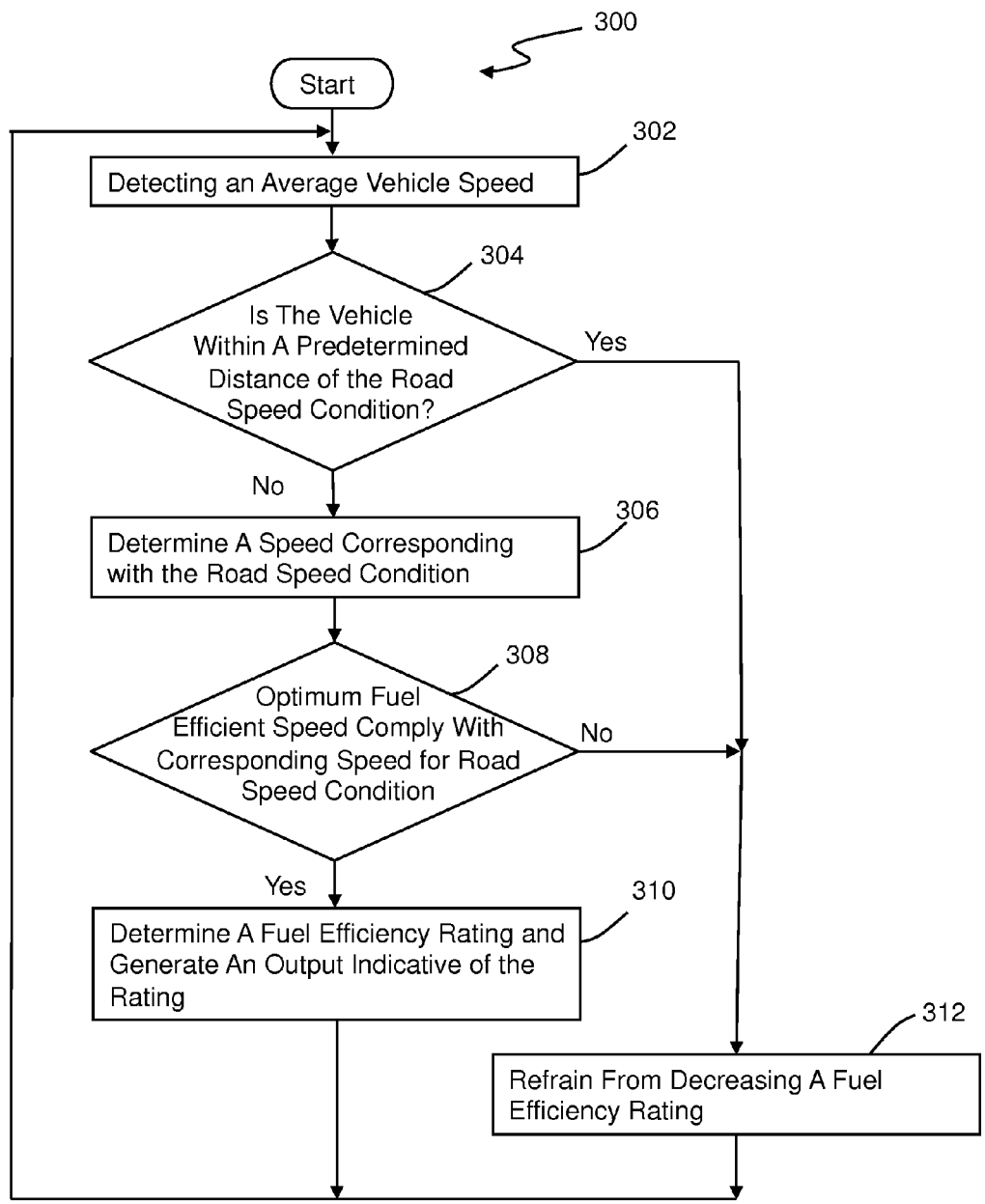
FIG. 3 illustrates a flow chart for another embodiment of a process for operating the driver coaching system of FIG. 1.

Referring to FIG. 3, another embodiment of a process 300 for operating the system 100 is shown. The process 300 may be similar to all steps in the process 200 of FIG. 2 and include steps similarly numbered in the three hundred series for clarification. However, the process 300 may be configured to disregard instantaneous fuel economy of the vehicle in calculations of the fuel efficiency rating, when the vehicle is driven through categorically all road conditions. In particular, the process may include step 304 and immediately proceed to step 312 without updating the rating, when in preceding step 304, the controller determines that the vehicle is within a predetermined distance of the road condition. The process in FIG. 2 may take at least the additional step 208 of considering the optimum speed and the speed corresponding with the road condition, when determining whether to suspend the rating process.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A driver coaching system, comprising:
an input device configured to generate a signal indicative of a road sign displaying a speed limit; and
an advisory device configured to
display an output indicative of a fuel efficiency rating based on a vehicle speed and an optimum fuel efficient speed, and
refrain from decreasing the rating when the speed limit prohibits the optimum fuel efficient speed and the vehicle speed is in compliance with the speed limit, wherein one or more of
the advisory device refrains from decreasing the fuel efficiency rating responsive to the advisory device determining that the signal indicates the road sign displays a minimum speed limit greater than the optimum fuel efficient speed and the vehicle speed is at least the minimum speed limit, or
the advisory device refrains from decreasing the fuel efficiency rating responsive to the advisory device determining that the signal indicates the road sign displays a maximum speed limit less than the optimum fuel efficient speed and the vehicle speed is up to the maximum speed limit.

2. The driver coaching system of claim 1 wherein the advisory device decreases the fuel efficiency rating when the advisory device determines that the signal indicates a road sign displaying a minimum speed limit and further when the vehicle speed is less than the minimum speed limit.

3. The driver coaching system of claim 1 wherein the advisory device decreases the fuel efficiency rating when the advisory device determines that the signal indicates a road sign indicative of a maximum speed limit and further when the vehicle speed is greater than the maximum speed limit.

4. The driver coaching system of claim 1 wherein the advisory device decreases the fuel efficiency rating when the advisory device determines that the signal indicates a road sign indicative of a maximum speed limit and further when the vehicle speed is at least 16 kilometers per hour more than the maximum speed limit.

5. The driver coaching system of claim 4 wherein the advisory device decreases the fuel efficiency rating by a squared function of the vehicle speed above the maximum speed limit.

6. The driver coaching system of claim 4 wherein the advisory device decreases the fuel efficiency rating by a squared function of the vehicle speed that is greater than 16 kilometers per hour above the maximum speed limit.

7. The driver coaching system of claim 1 wherein the input device includes a traffic sign recognition device configured to generate the signal responsive to detecting a road sign indicative of at least one of a maximum speed limit, a minimum speed limit, an intersection, a stop sign, a traffic light, a school zone, a bump, a railroad crossing, a bridge, a pedestrian crossing, an animal crossing, a bicycle crossing, a bicycle lane, a steep incline, a steep decline, a merging lane, an embankment, an uneven road surface, a construction site, a sharp turn, and a reduced speed zone.

8. The driver coaching system of claim 7 wherein the input device includes a global position satellite unit, and the advisory device is further configured to refrain from decreasing the fuel efficiency rating when the advisory device determines that the vehicle is within a predetermined distance of the road sign.

9. The driver coaching system of claim 8 wherein the input device includes a global position satellite unit that is coupled to at least one of a map database and a cloud-based input, each with a local speed limit lookup table for a plurality of routes.

10. The driver coaching system of claim 1, further comprising:
a controller generating an actuation signal; and
at least one of a display screen and a haptic feedback mechanism receiving the actuation signal and conveying to a driver the fuel efficiency rating to maximize an operating economy of the vehicle in response to receiving the actuation signal, and the fuel efficiency rating for the haptic feedback mechanism being one of a pedal position feedback sensory signal adjusting an intensity of pedal resistance to movement.

11. A method comprising:
generating a signal indicating a road sign displaying a speed limit;
displaying an output indicating a fuel efficiency rating based on a vehicle speed and an optimum fuel efficient speed; and
refraining from decreasing the fuel efficiency rating responsive to determining the signal indicates a road sign displaying a minimum speed limit greater than the optimum fuel efficient speed and the vehicle speed is at least the minimum speed limit.

12. The method of claim 11, further comprising decreasing the fuel efficiency rating responsive to determining that the signal indicates a road sign displaying a minimum speed limit and further when the vehicle speed is less than the minimum speed limit.

13. The method of claim 11, further comprising decreasing the fuel efficiency rating responsive to determining that the signal indicates a road sign indicative of a maximum speed limit and further when the vehicle speed is greater than the maximum speed limit.

14. The method of claim 11, further comprising decreasing the fuel efficiency rating responsive to determining that the signal indicates a road sign indicative of a maximum speed limit and further when the vehicle speed is at least 16 kilometers per hour more than the maximum speed limit.

15. The method of claim 14, further comprising decreasing the fuel efficiency rating by a squared function of the vehicle speed above the maximum speed limit.

16. The method of claim 14, further comprising decreasing the fuel efficiency rating by a squared function of the vehicle speed that is greater than 16 kilometers per hour above the maximum speed limit.

17. The method of claim 11, further comprising generating the signal responsive to detecting a road sign indicative of at least one of a maximum speed limit, a minimum speed limit, an intersection, a stop sign, a traffic light, a school zone, a bump, a railroad crossing, a bridge, a pedestrian crossing, an animal crossing, a bicycle crossing, a bicycle lane, a steep incline, a steep decline, a merging lane, an embankment, an uneven road surface, a construction site, a sharp turn, and a reduced speed zone.

18. The method of claim 17, further comprising refraining from decreasing the fuel efficiency rating responsive to determining that the vehicle is within a predetermined distance of the road sign.

19. The method of claim 11, further comprising displaying the fuel efficiency rating to maximize an operating economy of the vehicle in response to receiving an actuation signal, the fuel efficiency rating for the haptic feedback mechanism being one of a pedal position feedback sensory signal adjusting an intensity of pedal resistance to movement.

20. A method comprising:
generating a signal indicating a road sign displaying a speed limit;
displaying an output indicating a fuel efficiency rating based on a vehicle speed and an optimum fuel efficient speed; and
refraining from decreasing the fuel efficiency rating responsive to determining the signal indicates a road sign displaying a maximum speed limit less than the optimum fuel efficient speed and the vehicle speed is up to the maximum speed limit.

21. The method of claim 20, further comprising decreasing the fuel efficiency rating responsive to determining that the signal indicates a road sign displaying a minimum speed limit and further when the vehicle speed is less than the minimum speed limit.

22. The method of claim 20, further comprising decreasing the fuel efficiency rating responsive to determining that the signal indicates a road sign indicative of a maximum speed limit and further when the vehicle speed is greater than the maximum speed limit.

23. The method of claim 20, further comprising decreasing the fuel efficiency rating responsive to determining that the signal indicates a road sign indicative of a maximum speed limit and further when the vehicle speed is at least 16 kilometers per hour more than the maximum speed limit.

24. The method of claim 23, further comprising decreasing the fuel efficiency rating by a squared function of the vehicle speed above the maximum speed limit.

25. The method of claim 23, further comprising decreasing the fuel efficiency rating by a squared function of the vehicle speed that is greater than 16 kilometers per hour above the maximum speed limit.

26. The method of claim 20, further comprising generating the signal responsive to detecting a road sign indicative of at least one of a maximum speed limit, a minimum speed limit, an intersection, a stop sign, a traffic light, a school zone, a bump, a railroad crossing, a bridge, a pedestrian crossing, an animal crossing, a bicycle crossing, a bicycle lane, a steep incline, a steep decline, a merging lane, an embankment, an uneven road surface, a construction site, a sharp turn, and a reduced speed zone.

27. The method of claim 26, further comprising refraining from decreasing the fuel efficiency rating responsive to determining that the vehicle is within a predetermined distance of the road sign.

28. The method of claim 20, further comprising displaying the fuel efficiency rating to maximize an operating economy of the vehicle in response to receiving an actuation signal, the fuel efficiency rating for the haptic feedback mechanism being one of a pedal position feedback sensory signal adjusting an intensity of pedal resistance to movement.

* * * * *